United States Patent [19]
Johnson

[11] 4,402,546
[45] Sep. 6, 1983

[54] SLIDE LOCK SEAT BACK ADJUSTER

[75] Inventor: James J. Johnson, Southfield, Mich.

[73] Assignee: General Motors Corporation, Detroit, Mich.

[21] Appl. No.: 318,010

[22] Filed: Nov. 4, 1981

[51] Int. Cl.³ .............................................. A47C 1/027
[52] U.S. Cl. .................................. 297/374; 297/355; 297/376
[58] Field of Search ............................... 297/374–376, 297/354, 355, 363–371

[56] References Cited
U.S. PATENT DOCUMENTS

| 178,720 | 6/1876 | Brintnall | 297/376 X |
| 633,948 | 9/1899 | Bigelow | 297/376 |
| 3,133,764 | 5/1964 | Naef | 297/367 |
| 3,283,342 | 11/1966 | Pankert | 297/376 X |
| 3,366,416 | 1/1968 | Tabor | 297/361 |
| 4,279,442 | 7/1981 | Bell | 297/375 X |

Primary Examiner—William E. Lyddane
Attorney, Agent, or Firm—Patrick M. Griffin

[57] ABSTRACT

A vehicle seat includes a pivoted seat back and a slide lock mechanism mounted in the linear support on the seat and adjustable with respect to the support to lock the seat back in various reclined positions.

3 Claims, 6 Drawing Figures

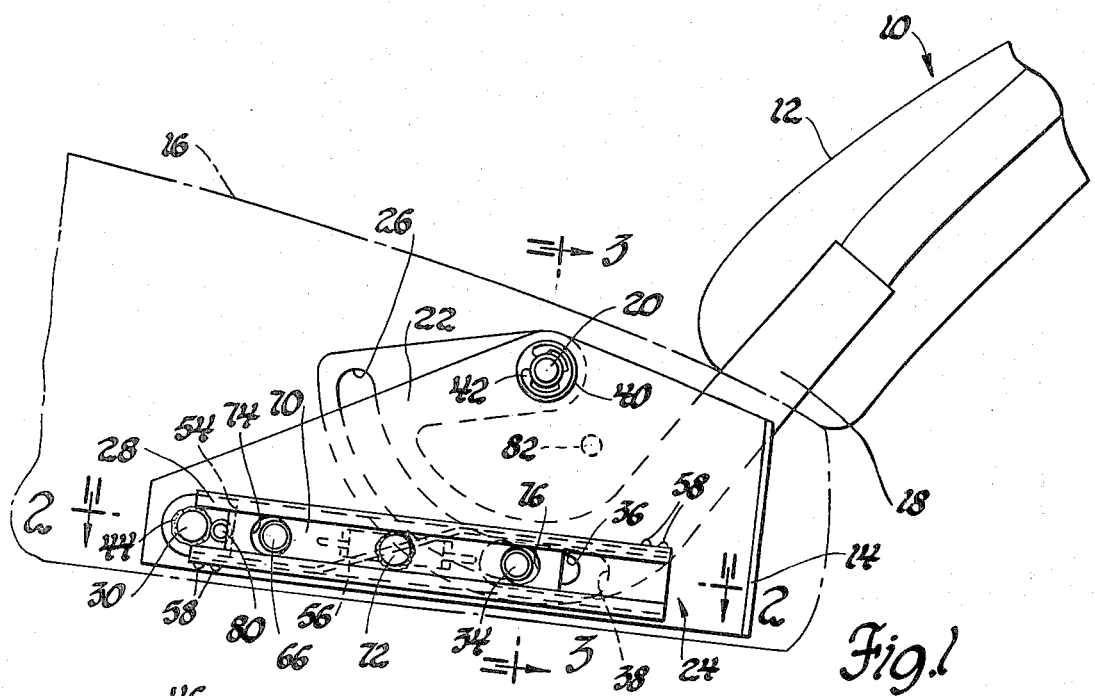
Fig.1
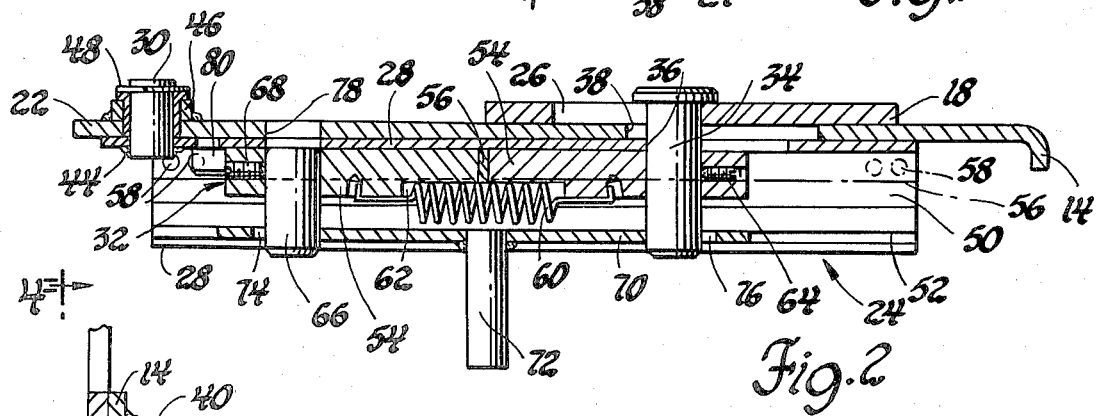
Fig.2
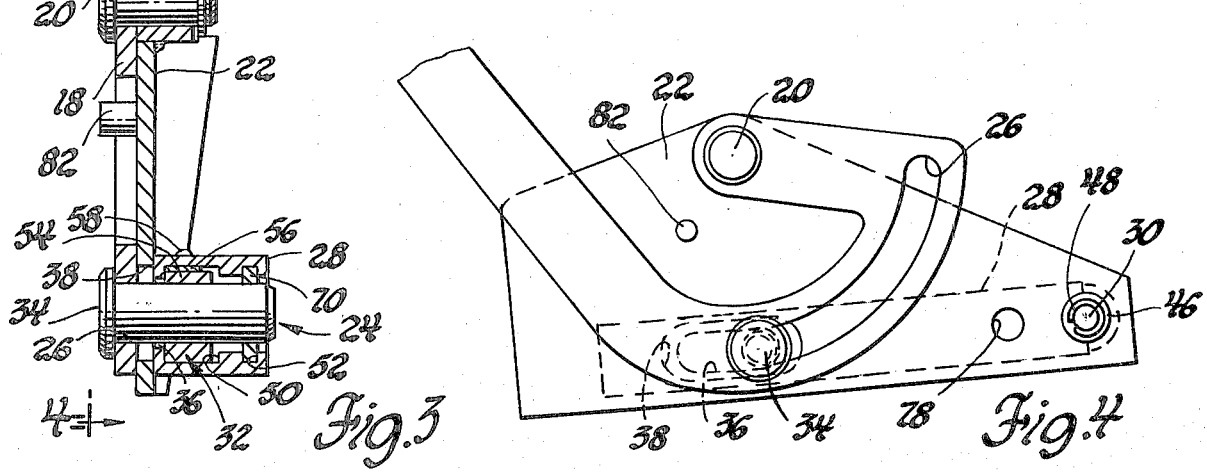
Fig.3
Fig.4

SLIDE LOCK SEAT BACK ADJUSTER

BACKGROUND OF THE INVENTION

This invention relates generally to seat back adjusters and specifically to a seat back adjuster to lock a seat back with respect to a seat cushion in an infinite number of reclined positions while permitting the seat back to be freely tilted.

Seat back adjusters in the prior art include several general types. One type includes a toothed member and one or more pawl elements engageable with the toothed member to lock the seat back in a plurality of positions. Typical of this type of seat adjuster is that shown in U.S. Pat. No. 4,143,905 to Hensel et al. Another type of adjuster includes a shaft receivable through a plurality of annular discs contained within a cylinder. In the locked position, the discs are tilted with respect to the cylinder. A release mechanism moves the discs to a perpendicular position to allow the seat back to be adjusted to a new position. Such an adjuster is shown in U.S. Pat. No. 3,366,416 to Tabor. Another type of seat adjuster uses a power operated screw jack mechanism.

All seat back adjusters must accommodate the arcuate rotating movement of the seat back with respect to the seat cushion frame. It is desirable that the adjusting mechanism itself be relatively simple and easily operable. A slide lock mechanism fulfills these objectives and has the additional features of providing a positive stop and being movable along a linear path.

SUMMARY OF THE INVENTION

The seat back adjuster of the subject invention provides a manually operable infinitely adjustable seat back adjuster which supports the seat back in a plurality of reclined positions. The adjuster incorporates a slide lock mechanism mounted in a linear support member and adjustable by a simple back and forth linear movement. The slide lock support member is pivotally mounted to the seat cushion frame and maintains a positive stop pin which moves linearly with respect to the support member within an arcuate slot in the seat back frame to lock the seat back in a reclined position while allowing the seat back to tilt forward freely.

In the embodiment disclosed, a seat back frame is pivoted at a first pivot to the seat cushion frame by a link member pivotally connected to a side plate on the seat cushion frame. An arcuate closed end slot is defined in the link member and generated about the first pivot. Joined to the side plate at a second pivot is a linear channel shaped slide lock support member containing a double wedge slide lock. A stop pin securely attached to one of the wedges passes through a linear clearance slot in the support member and through a clearance slot in the seat cushion frame side plate and engages the closed end of the arcuate slot in the seat back frame link member. The pin acts as a positive stop for the seat back frame as the force of the closed end of the arcuate slot on the stop pin acts to push the wedges of the slide lock together. A control link mounted in the support member allows the wedges to be separated and moved to a new position by moving the control link forward or backward. During this movement, the slide lock support member pivots about the second pivot so that the stop pin is maintained within the arcuate slot as it moves linearly with respect to the support member. Thus, a linear slide lock may be used to provide an infinitely adjustable positive stop for a seat back which rotates about an arcuate path with respect to a seat cushion frame. The same mechanism may be used for seat backs which follow different arcuate paths. From any reclined position, the seat back may always be freely tilted forwardly as the closed end of the arcuate slot moves away from the stop pin.

It is, therefore, an object of the invention to provide a seat back adjuster having a linearly movable slide lock mechanism to lock a pivoted seat back in any one of a plurality of reclined positions. It is another object of the invention to provide such a seat back adjuster in which the lock mechanism may be operated by a linear manual motion. It is yet another object of the invention to provide such a seat back adjuster which may be used with different seat backs which rotate about different arcuate paths with respect to the seat cushion.

BRIEF DESCRIPTION OF THE DRAWINGS

These and other objects of the invention will be apparent from the following written description and the drawing in which:

FIG. 1 is a side elevational view of a vehicle seat embodying the seat back adjuster of this invention with the seat back shown in the most reclined position.

FIG. 2 is an enlarged sectional view taken along the line 2—2 of FIG. 1.

FIG. 3 is an enlarged sectional view taken along the line 3—3 of FIG. 1.

FIG. 4 is a reduced size view taken along line 4—4 of FIG. 3.

DESCRIPTION OF THE PREFERRED EMBODIMENT

Figure 5:
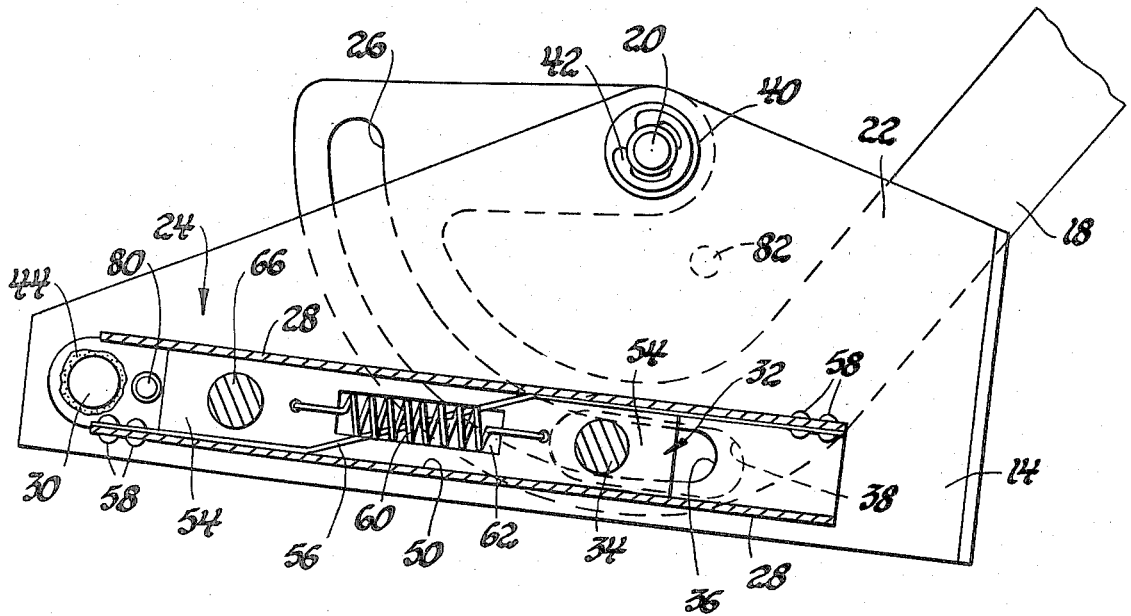
FIG. 5 is an enlarged partially broken away view of a portion of FIG. 1 with the seat in the most reclined position.

Referring first to FIG. 1, a seat back frame 10 supports a seat back 12 and a seat cushion frame 14 supports a seat cushion 16. A gooseneck link 18, rigidly attached to the seat back frame 10, is rotatably attached by a first pivot pin 20 to a side plate 22 of the seat cushion frame 14. The seat back adjuster of the invention designated generally 24 locks seat back frame 10 in a plurality of reclined positions with respect to the seat cushion frame 14, with the most reclined position shown.

Referring to FIGS. 1 and 4, gooseneck link 18 has a closed arcuate slot 26 therein defined about the pivot pin 20, as best seen in FIG. 4. A channel shaped support member 28 is mounted by a second pivot pin 30 to side plate 22. Support member 28 supports a slide lock mechanism designated generally 32. A headed stop pin 34, mounted to slide lock mechanism 32 as described below, passes through an elongated linear clearance slot 36 in the base of support member 28, a clearance slot 38 cut through side plate 22, and the arcuate slot 26. Clearance slot 36 is long enough to clear stop pin 34 as it moves in support member 28 and slot 38 is sized larger than slot 36 to provide clearance for stop pin 34 as will be described below.

Figure 6:
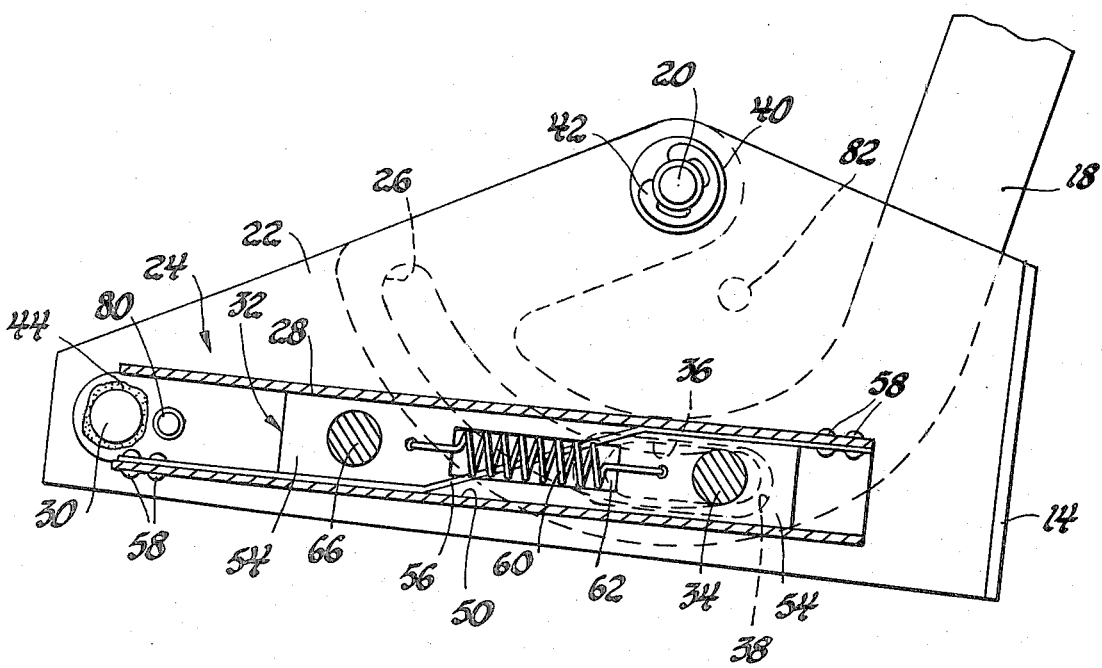
FIG. 6 is a view similar to FIG. 5 with the seat back in the upright position.

Referring now to FIG. 3, first pivot pin 20 passes through gooseneck link 18 and through a bushing 40 on side plate 22 where it is retained by a snap ring 42 or similar fastener. As seen in FIG. 2, second pivot pin 30 is welded at 44 to the base of support member 28, passes through a sleeved bushing 46 on side plate 22, and is retained by a snap ring 48. Referring again to FIG. 3, support member 28 has a generally channel shaped cross-section and has defined on the inside walls thereof an inner, relatively wide, two-sided slot 50 and an outer, relatively narrow two-sided slot 52. The slide lock mechanism 32, as seen in FIGS. 5 and 6, includes two similar shaped wedge members 54 received within slot 50 and separated by a flexible strip or ribbon 56 of spring steel or similar material. The ribbon 56 fits closely between each wedge member 54 and a side of slot 50 and is riveted at 58 at the ends thereof to support member 28. A spring 60 hooked between wedge members 54 is seated partially within a groove 62 formed in each wedge member 54. Spring 60 continually biases wedge members 54 toward one another. A set screw 64 mounts stop pin 34 within one wedge member 54 and a control pin 66 is mounted to the other wedge member 54 by a set screw 68.

Referring now to FIGS. 1, 2 and 3, a control link 70 is slidably received in slot 52 and includes a control handle 72 and a pair of enlarged closed slots 74 and 76 which respectively receive the pins 66 and 34. As best seen in FIG. 1, slots 74 and 76 are offset relative to one another so that as link member 70 is moved, only one of pins 66 and 34 will be contacted. Assembly of control link 70 into slot 52 is simplified by a hole 78 through both support member 28 and slide plate 22, visible in FIGS. 2 and 4, which allows pin 66 to be temporarily moved out of slot 52. Stop pin 34 may be similarly temporarily moved out of slot 52 during assembly of link 70 into slot 52. Pins 66 and 34 are moved through the slots 74 and 76 after control link 70 is inserted in the slot 52, and set screws 64 and 68 are then tightened. A bumper pin 80 is included on the base of support member 28 near pivot pin 30 which defines the forward limit for movement of the slide lock mechanism 32. In addition, a bumper pin 82 is joined to the inside of side plate 22, also visible in FIG. 4. A conventional inertial latch may be included in combination with gooseneck link 18 to operate in conventional fashion to prevent seat back 10 from tilting forward in the event of a rapid deceleration.

The operation of slide lock mechanism 32 may be understood by referring to FIGS. 1, 2, 5 and 6.

As seen in FIG. 2, when seat back 10 is in the most reclined position, and also when it is in the upright position or any position intermediate the two, the right hand or closed end of arcuate slot 26 and link 18 engages stop pin 34 as seat back 10 and gooseneck link 18 are biased backwards or clockwise by gravity and the weight of the occupant. Seat back 10 is locked in such a position as stop pin 34, which is rigid to one of the wedges 54, will bias wedge members 54 together causing them to be squeezed together along the separating ribbon 56 and into the sides of slot 50 in support member 28. Any force tending to squeeze wedges 54 together creates this locking action. To move seat back 10 to a more reclined position, the occupant moves control handle 72, and consequently link 70, toward the front of the seat or to the left as seen in FIG. 1. Because of the offset relation of slots 74 and 76, when link 70 is moved toward the front of the seat, the right hand edge of slot 74 will engage pin 66 tending to separate the wedges 54 while pin 34 will move away from the left hand edge of slot 76 and will ride near the center without contacting the offset right hand edge of slot 76. Thus, the only force is one tending to separate wedges 54 and they will move forwardly with respect to support member 28 while spring 62 prevents lost motion between them. When control link 70 is released, control pin 34 will be at a new, more forward, position and seat back 10 will be at a more reclined position as the closed end of arcuate slot 26 contacts pin 34. Bumper pin 80 defines the forward limit of wedges 54 at the most reclined position. A longer support member 28 will allow a more reclined position for seat back 10.

To move seat back 10 from a reclined position to a more upright position or to the most upright position, the occupant moves control handle 72 and link 70 in the opposite direction or to the right as viewed in FIG. 1. This will cause the left hand edge of slot 76 to engage pin 34 while pin 66 will ride near the center of slot 74 without contacting either edge thereof and, again, the only force on pins 34 and 66 will be one tending to separate them. Consequently, wedges 54 will be moved to the right within support member 28, moving pin 34 to the more rearward position, which, when the closed end or arcuate slot 26 engages pin 34, will leave the seat lock in a more upright position. Seat back 10 may always be reclined freely forwardly as the closed end of arcuate slot 26 leaves pin 34 and pin 34 moves freely through arcuate slot 26. This free forward tilting motion is limited by bumper pin 82 which engages gooseneck link 18 and prevents the other end of slot 26 from engaging pin 34.

The embodiments of the invention in which an exclusive property or privilege is claimed are defined as follows:

1. An infinite position seat back adjuster for a vehicle seat or the like of the type having a seat back frame which is tiltable with respect to a seat cushion frame about a first pivot, comprising:

the seat back frame including an arcuate slot generated about the first pivot and including at least one closed end, a support member mounted to the seat cushion frame by a second pivot, a manually operable releasable locking means associated with the support member and linearly movable with respect thereto between a plurality of locked positions, a stop pin associated with the locking means and movable therewith, the pin being receivable through the arcuate slot and engageable with the closed end of the arcuate slot to provide a positive stop for the seat back frame at a plurality of positions, movement of the support member about the second pivot as the releasable locking means is moved with respect to the support member maintaining the pin within the arcuate slot at each position of the seat back frame.

2. An infinite position seat back adjuster for a vehicle seat or the like of the type having a seat back frame and a seat cushion frame, comprising:

a link member associated with the seat back frame and pivotally joined to the seat cushion frame at a first pivot, the link member and seat back frame being tiltable with respect to the seat cushion frame about the first pivot, the link member further including therethrough an arcuate slot generated about the first pivot and including at least one closed end, a linear channel shaped member mounted to the seat cushion frame at a second pivot, a manually operable slide lock mechanism mounted in the channel shaped member and linearly movable with respect thereto among a plurality of locked positions, a stop pin mounted to the slide lock mechanism and movable therewith, the stop pin being receivable through the arcuate slot and engageable with the closed end of the arcuate slot to provide a positive stop for the link member and the seat back frame at a plurality of positions, movement of the channel shaped linear member about the second pivot as the slide lock mechanism moves within the channel shaped member maintaining the stop pin within the arcuate slot at the plurality of positions of the link member and seat back frame.

3. An infinite position seat back adjuster for a vehicle seat or the like of the type having a seat back frame and a seat cushion frame, comprising:

a side plate joined to the seat cushion frame, a link member joined to the seat back frame, the link member being rotatably mounted to the side plate at a first pivot, the link member further including an arcuate slot therethrough generated about the first pivot, the arcuate slot having at least one closed end, a linear channel shaped member mounted to the side plate about a second pivot, a manually operable slide lock mounted in the channel shaped member and movable with respect thereto among a plurality of locked positions, a stop pin mounted to the slide lock and movable therewith, the stop pin being receivable through the arcuate slot and engageable with the closed end of the arcuate slot to provide a positive stop for the link member with respect to the channel shaped member and side plate at a plurality of positions, movement of the channel shaped member about the second pivot as the slide lock and stop pin move within the channel shaped member maintaining the stop pin within the slot at every position of the stop pin within the support member.

* * * * *